United States Patent [19]

Moddemeyer

[11] Patent Number: 4,728,421

[45] Date of Patent: Mar. 1, 1988

[54] FILTER APPARATUS FOR UTILIZATION WITH HOLLOW CYLINDRICAL FILTER ELEMENTS

[75] Inventor: Henry Moddemeyer, Los Angeles County, Calif.

[73] Assignee: Penguin Pumps, Inc., Sun Valley, Calif.

[21] Appl. No.: 862,973

[22] Filed: May 14, 1986

[51] Int. Cl.$^4$ .............................................. B01D 27/08
[52] U.S. Cl. ................................. 210/232; 210/443; 210/440; 210/DIG. 17; 55/498; 55/509
[58] Field of Search ............... 210/232, 350, 352, 439, 210/440, 441, 443, 444, 450, 451, 453, 238, DIG. 17; 55/359, 475, 496, 498, 501, 502, 504, 507, 509, 506, 422

[56] References Cited

U.S. PATENT DOCUMENTS

| | | | |
|---|---|---|---|
| 2,568,181 | 9/1951 | Zimmerman et al. | 210/451 |
| 2,827,174 | 3/1958 | Fernandez | 210/444 |
| 3,727,764 | 4/1973 | Ogden | 210/444 |
| 4,115,201 | 9/1978 | Malec | 210/350 |

Primary Examiner—Ernest G. Therkorn
Assistant Examiner—Linda Sue Evans
Attorney, Agent, or Firm—Robert R. Thornton

[57] ABSTRACT

A resilient compressor ball is compressed to urge an axially-movable circular knife-edge onto one end of a cylindrical filter element to form a seal therewith and to urge the filter element onto a fixed circular knife-edge having a fluid outlet opening therewithin to form a seal therewith. The movable knife-edge is concentrically formed on an axially-slidable tubular compressor element which confines the compressor ball within a hollow nut portion of a cap which is screwed onto a cylindrical shell having a base from which the fixed knife-edge extends in axial alignment with the movable knife-edge. When the cap is screwed onto the shell, the compression of the ball urges the movable knife edge against one end of the filter and the other end of the filter against the fixed knife-edge so as to seal the ends of the filter element and thus the seals formed at the knife-edges, while accommodating variances in the overall length of the filter element from its nominal length.

3 Claims, 1 Drawing Figure

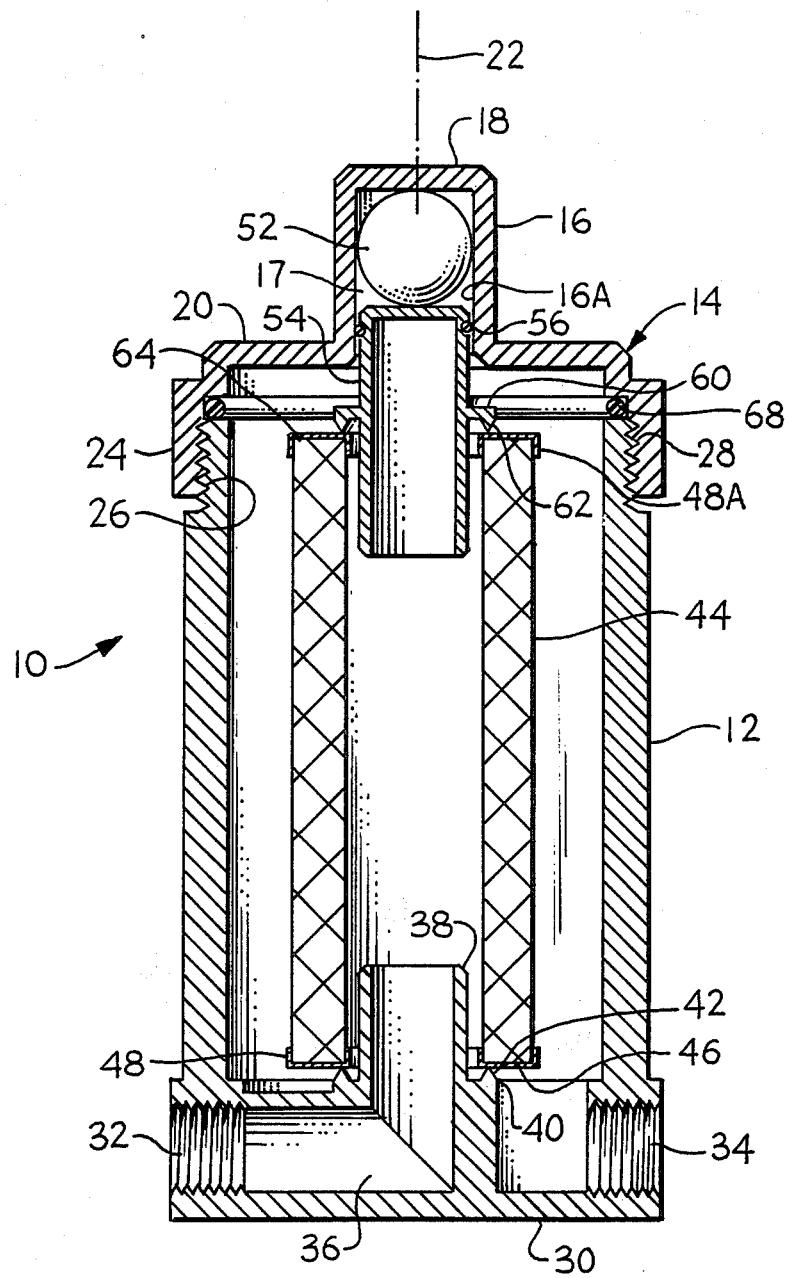

FILTER APPARATUS FOR UTILIZATION WITH HOLLOW CYLINDRICAL FILTER ELEMENTS

BACKGROUND OF THE INVENTION a. Field of the Invention

The invention relates to filter chambers using cylindrical filter elements in which the seal between the filter inlet and the filter outlet is formed by the filter element itself and by contact with the filter chamber at each end of the filter element.

b. Brief Summary of the Prior Art

Filter chambers utilizing a cylindrical filter element which separates the chamber fluid inlet from the chamber fluid outlet are well known. In such structure, seals are formed at the filter element ends by the filter chamber so as to prevent by-pass of the fluid being filtered between the fluid inlet and the fluid outlet. A circular knife edge formed on the interior of a removable chamber top which is bolted to the chamber has been used to seal the filter element against by-pass. However, such structures require that the filter element match with close precision the length of filter element for which the chamber is designed. Overly short filter elements will permit by-pass and overly long filter elements will prevent the top from closing the chamber to prevent leakage of fluid.

SUMMARY OF THE INVENTION

A filter chamber, according to the present invention, has a threaded cap attached to a shell member comprised by a cylindrical wall and a base, the threaded cap having a hollow top nut portion, the outer end of which is closed so as to enclose a resilient compressor ball and one end of an axially-movable tubular compressor which abuts the ball and extends into the shell, so that a circular shoulder with a knife edge flange depending therefrom formed on the tubular compressor is operable to engage one end of a cylindrical filter element within the chamber to form a seal therewith. An outlet tube on the base is axially aligned with the shell and tubular compressor and a fixed knife-edge circular boss formed on the base about the outlet tube extends toward the cap, so as to be operable to form a seal with the other end of the filter element, whereby the sealing pressure exerted on the filter element at the knife edges is selectively controlled by the degree to which the cap is screwed onto the shell to compress the ball against the tubular compressor.

BRIEF DESCRIPTION OF THE DRAWING

The invention may be more readily understood by referring to the accompanying drawing, which is a view, in section, of a filter chamber according to the present invention.

DESCRIPTION OF THE PREFERRED EMBODIMENT

Referring now to the drawing, there is shown, in section, a filter chamber 10 having a shell 12 and a cap 14. The cap 14 includes a top nut portion 16, which may be hexagonal in configuration to receive a wrench or socket, and has a hollow cylindrical interior 17 which is closed at one end 18 thereof. The top nut portion 16 terminates in a disc-shaped head portion 20 which is axially disposed with respect to a longitudinal shell axis 22. The head portion 20 has a peripheral depending flange 24, the inner portion 26 of which is threaded. As is shown in the drawing, the shell 12 terminates within the depending flange 24 in an outer threaded portion 28, the threads of which are complementary to the threaded inner portion 26 of the flange 24. Thus, the cap 14 may be screwed onto the shell 12 or unscrewed from the shell 12 by clockwise or counterclockwise relative rotation. Normally, the cap is rotated and the shell fixed, the cap being rotated by means of engagement of the top nut portion 16 by a wrench or socket.

The shell 12 has a unitary base portion 30 formed thereon remote from the threaded portion 28. The base portion 30 has a fluid outlet 32 and a fluid inlet 34. The fluid outlet 32 opens into a communicating passage 36 formed in the base portion 30 to connect the fluid outlet 32 to an outlet tube 38, which is axially aligned with the axis 22. The base portion 30 has a circular boss 40 disposed about the outlet tube 38. A circular knife edge 42 is formed on the boss 40 so as to extend toward the cap 14. A cylindrical filter element 44 rests on the knife edge 42 at one end portion 46 thereof. Conventionally, the end portion 46 is sealed by a resilient material end seal 48, which may be the filter material itself. The knife edge 42 engages the resilient end seal 48 so as to seal the outlet tube 38 from direct communication with the fluid inlet 34.

The top nut portion 16 encloses a resilient ball 52 abutting the closed end 18. A tubular compressor 54 is disposed within the hollow inner portion 17 of the top nut 16 so as to be axially aligned with the axis 22. An O-ring 56 is mounted in a circular recess 58 on the tubular compressor 54 and engages the top nut portion 16 on its inner surface 16A. The tubular compressor 54 has a circular shoulder 60 with a depending knife-edge flange 62. As shown in the drawing, the depending knife edge flange 62 engages a resilient end seal 48A formed on a second end 64 of the cylindrical filter element 44. A large O-ring 68 is disposed at the threaded end 26 of the flange 24 so as to form a seal between the shell 12 and the cap 14 when the cap is screwed onto the shell 12.

The operation of the filter chamber will now be described. In the initial installation of the filter element 44, the cap 14 is unscrewed from the shell 12. When removed, the cap 14 carries with it the tubular compressor 54, which is held within the hollow portion 17 of the top nut 16 by the O-ring 56. The filter element 44 is then placed within the shell 12 so as to be axially aligned on the outlet tube 38 so that the resilient end seal 48 rests on the circular knife edge 42. The cap 14 is then screwed tightly onto the shell 12. Screwing the cap 14 tightly onto the shell 12 compresses the O-ring 68 between the cap 14 and the shell 12, thereby sealing the chamber 10 of the cap-shell junction.

The tubular compressor 54 extends into the interior of the filter element 44, so that the tubular compressor knife edge flange 62 engages the end seal 48A when the cap 14 is screwed tightly onto the shell 12 so as to compress the resilient ball 52 against the tubular compressor 54. The filter element 44 is thereby urged against the base circular knife edge 42 by the pressure exerted on the filter element 44 at the end seal 48A by the knife edge 62 to form seals at the knife edges 42, 62 about the filter element end portions 46, 64.

The resilient ball 52 is compressed by screwing the cap 14 onto the shell 12 after the initial engagement of the tubular compressor knife edge 62 with the filter element end seal 48A. As the cap 14 is screwed further onto the shell 12 after the initial contact of the tubular compressor knife edge flange 62 with the filter end seal 48A, the resilient ball 52 is further compressed within the hollow cylindrical interior 17. This compression is translated through the tubular compressor 54 into a sealing pressure by the knife edge flange 62 on the filter element end seal 48A. Since the circular knife edge 42 is fixed while the knife edge flange 62 is movable axially with respect thereto, the same sealing pressure as exists between the knife edge flange 62 and the end seal 48A exists between the circular knife edge 42 and the end seal 48.

As will be apparent, fluid to be filtered is applied to the fluid inlet 34 under pressure and passes through the filter element 44 to the tube outlet 38 in the interior of the filter element 44, from which it passes through the fluid outlet 32 and from the filter chamber 10.

A particular advantage of a filter chamber according to the present invention is that the tubular compressor which forms the seal through the knife edge 62 is slidable axially within the cylindrical interior 17 of the top nut portion 16 so as to be movable relative to the cap 14. The sealing pressure or urging for the filter ends is provided by compression of the resilient ball 52. In the prior art, such knife edges have been fixed with respect to the cap 14 so that the length of the filter element is a critical factor in insuring that an adequate seal is formed. The use of the tubular compressor and resilient ball of the present invention eliminates the prior art criticality of the overall length of the filter element in insuring that seals are formed about the ends of the filter element. By way of example, it may be considered that the filter element 44 shown in the drawing is longer than the nominal standard length for such an element. As will be apparent, the cap 14 is screwed down onto the shell 12 to cause compression of the resilient ball 52 to initiate contact of the depending knife edge flange 62 with the filter element end 64. Further rotation of the cap onto the shell compresses the ball 52, thus insuring the formation of a seal between the filter element end 64 and the flange knife edge 62. If, on the other hand, the filter element 44 were shorter in overall length than the nominal standard length, the knife edge 62 would still form a seal with the filter element end 64 as the cap 14 is screwed onto the shell 12 and the resilient ball 52 compression urges the knife edge 62 against the filter element end 64.

Thus, in the present invention, the seals are formed by screwing the cap 14 tightly onto the shell 12 to compress the resilient ball 52 by the engagement of the tubular compressor 54 with the filter element 44, irrespective of the variance of the filter element length with the standard length. Consequently, whereas conventional filter chambers require that the filter element length conform to the nominal standard length with some degree of precision, in the present invention a substantial variation in filter length from the nominal standard is accommodated by use of the tubular compressor 54 and the resilient ball 52 to provide the required sealing of the filter element 44 at its ends 48, 48A without any variance in filtration performance by reason of fluid by-pass at the point of attempted sealing. By utilization of the present invention, this sealing is accomplished irrespective of whether the filter element length is greater or less than standard.

The invention claimed is:
1. Filter apparatus comprising:
a hollow cylindrical filter element having a first open end and a second open end;
a cylindrical shell member terminating at a first end in means defining a base having a filter inlet and a filter outlet and terminating at a second end in means defining a threaded longitudinal surface,
said base defining means including means adapted to receive the first open end of the filter element so as to form a seal therewith between said inlet and said outlet;
a cap terminating in a hollow cylindrical portion closed at one end thereof,
said cap having means defining a threaded portion remote from said hollow cylindrical portion,
said threaded cap portion being complementary to said shell threaded longitudinal surface,
whereby said cap may be selectively screwed onto or off of said shell member;
a resilient compressor ball disposed within the cap hollow cylindrical portion so as to abut the closed end thereof;
a tubular compressor axially disposed within the cap hollow cylindrical portion so as to contain the resilient ball therewithin; and
sealing means formed on said tubular compressor so as to be operable to engage the second open end of the filter element to form a seal thereacross in response to compression of the resilient ball between the tubular compressor and the cap hollow cylindrical portion closed end when the cap is screwed onto the shell.

2. The apparatus of claim 1, and in which the sealing means comprises a circular shoulder formed on the tubular compressor,
said shoulder having a knife-edge flange depending therefrom to engage the second open filter element end.

3. Filter apparatus comprising:
a cylindrical open-ended filter element;
a shell member having a cylindrical wall terminating in a base having means defining a filter inlet and means defining a filter outlet,
said filter outlet communicating with an axially disposed outlet tube opening into the interior of the shell so as to be spaced from the wall thereof,
said filter inlet opening into the shell interior adjacent the wall thereof,
said base having a knife-edge circular boss axially disposed about and spaced from said outlet tube so as to be operable to receive one end of the cylindrical filter element to form a seal thereon with respect to direct communication between the filter inlet and filter outlet, and
said shell wall terminating remote from the base in an outer threaded portion;
a cap adapted to mate with said shell wall and having a hollow top portion having a hollow cylindrical interior closed at the outer end thereof;
a head portion into which said hollow top portion terminates remote from the closed end,
said head portion being generally of an annular disc-like configuration so that the hollow portion is axially disposed thereon, and
said head portion terminating at its outer periphery in a depending flange having a threaded inner surface adapted to engage the threaded outer portion of the shell wall to threadably connect the cap to the shell member;
a resilient compressor ball disposed within the hollow top portion abutting the closed end thereof;
a tubular compressor disposed within the hollow top portion abutting the ball so as to be axially aligned with the cylindrical interior of the hollow top portion and with the outlet tube when the cap is threaded onto the shell wall, said tubular compressor having an exterior circular shoulder with a depending knife-edge flange formed thereon so as to be operable to form a seal on the other end of the filter element disposed with the shell, whereby seals at each end of the filter element when disposed within the shell are formed by compression of the filter element between the knife-edge circular boss and knife-edge flange in response to the urging of the tubular compressor toward the base by the compression of the compressor ball resulting from the cap being screwed onto the shell; and sealing means disposed between the cap and shell adjacent the threaded portions thereof so as to form a seal therebetween when the cap is screwed onto the shell.

* * * * *